US011346615B2

(12) United States Patent
Olivarez et al.

(10) Patent No.: US 11,346,615 B2
(45) Date of Patent: May 31, 2022

(54) MULTI-FUNCTION THERMAL ABSORBER AND ISOLATOR USING LIQUID-TO-GAS PHASE CHANGE MATERIAL

(71) Applicant: Raytheon Company, Waltham, MA (US)

(72) Inventors: Leonel A. Olivarez, Tucson, AZ (US); Adam C. Wood, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 147 days.

(21) Appl. No.: 16/410,287

(22) Filed: May 13, 2019

(65) Prior Publication Data
US 2020/0363139 A1  Nov. 19, 2020

(51) Int. Cl.
F28D 20/02 (2006.01)

(52) U.S. Cl.
CPC ......... *F28D 20/028* (2013.01); *F28D 20/025* (2013.01)

(58) Field of Classification Search
CPC .... B64G 1/50; B64G 1/58; B64C 1/38; F42B 15/34; F28D 20/02; F28D 20/025; F28D 20/028
See application file for complete search history.

(56) References Cited

U.S. PATENT DOCUMENTS

| | | | | |
|---|---|---|---|---|
| 2,922,291 A * | 1/1960 | Fox | ...................... | B64D 13/006 62/171 |
| 2,925,722 A * | 2/1960 | Blackburn | ......... | H05K 7/20345 62/175 |
| 3,140,064 A * | 7/1964 | Gengelbach | ............. | B64G 1/58 244/159.1 |
| 3,731,893 A * | 5/1973 | Stalmach, Jr. | ........... | B64G 1/58 244/171.8 |
| 4,592,950 A * | 6/1986 | Le Touche | ................ | G11B 5/72 442/283 |
| 4,739,952 A * | 4/1988 | Giles | ......................... | B64C 1/38 244/117 A |

(Continued)

FOREIGN PATENT DOCUMENTS

| | | | | |
|---|---|---|---|---|
| CN | 108582922 A | | 9/2018 | |
| DE | 4122465 A1 * | | 1/1993 | ............... B64G 1/58 |

(Continued)

OTHER PUBLICATIONS

Wikipedia, "Multi-layer insulation," Feb. 2019, 4 pages.

(Continued)

*Primary Examiner* — Eric S Ruppert

(57) ABSTRACT

An apparatus includes multiple layers of phase-stable material, where adjacent layers of the phase-stable material are separated by multiple spaces. The apparatus also includes liquid phase change material in the spaces between the adjacent layers of the phase-stable material. The liquid phase change material is configured to become gaseous phase change material based on thermal energy absorbed by the liquid phase change material. The apparatus further includes at least one release configured to block passage of the liquid phase change material out of the spaces between the adjacent layers of the phase-stable material. The at least one release is also configured to allow passage of the gaseous phase change material out of the spaces between the adjacent layers of the phase-stable material.

20 Claims, 6 Drawing Sheets

(56) References Cited

U.S. PATENT DOCUMENTS

| | | | | |
|---|---|---|---|---|
| 4,991,797 | A | * 2/1991 | Miller | B64C 1/38 |
| | | | | 165/41 |
| 9,952,026 | B2 | 4/2018 | Wood | |
| 2010/0255277 | A1 | 10/2010 | Platt et al. | |
| 2016/0046096 | A1 | 2/2016 | Squires et al. | |
| 2017/0010321 | A1 | 1/2017 | Wang et al. | |
| 2018/0080719 | A1 | * 3/2018 | Levy | F28F 13/10 |

FOREIGN PATENT DOCUMENTS

| | | | |
|---|---|---|---|
| FR | 2597573 | A3 | 10/1987 |
| WO | 2017153693 | A1 | 9/2017 |

OTHER PUBLICATIONS

International Search Report and Written Opinion of the International Searching Authority in connection with International Patent Application No. PCT/US2019/064725 dated Feb. 13, 2020, 12 pages.

* cited by examiner

MULTI-FUNCTION THERMAL ABSORBER AND ISOLATOR USING LIQUID-TO-GAS PHASE CHANGE MATERIAL

TECHNICAL FIELD

This disclosure is generally directed to thermal management techniques. More specifically, this disclosure is directed to a multi-function thermal absorber and isolator using liquid-to-gas phase change material.

BACKGROUND

Missiles, rockets, and other flight vehicles routinely accelerate to high speeds after launch. During high-speed flight, heat is created by friction of the surrounding air against the outer skin of a flight vehicle, which is often referred to as "aeroheating." The heat produced by this process can travel through the airframe of the flight vehicle and into the internal components of the flight vehicle. The amount of heat transferred to the internal components of the flight vehicle can be significant and can interfere with the proper operation of or damage the flight vehicle's components. Conventional approaches for solving this problem typically involve the use of an insulator, such as an air gap or a solid insulator, to reduce heat transfer between the outer skin and the internal components of the flight vehicle. Additionally, solid heat sinks can be used to remove heat from within the interior of the flight vehicle.

SUMMARY

This disclosure provides a multi-function thermal absorber and isolator using liquid-to-gas phase change material.

In a first embodiment, an apparatus includes multiple layers of phase-stable material, where adjacent layers of the phase-stable material are separated by multiple spaces. The apparatus also includes liquid phase change material in the spaces between the adjacent layers of the phase-stable material. The liquid phase change material is configured to become gaseous phase change material based on thermal energy absorbed by the liquid phase change material. The apparatus further includes at least one release configured to block passage of the liquid phase change material out of the spaces between the adjacent layers of the phase-stable material. The at least one release is also configured to allow passage of the gaseous phase change material out of the spaces between the adjacent layers of the phase-stable material.

In a second embodiment, a system includes one or more protected components and a thermal absorber and isolator configured to thermally insulate the one or more protected components. The thermal absorber and isolator includes multiple layers of phase-stable material, where adjacent layers of the phase-stable material are separated by multiple spaces. The thermal absorber and isolator also includes liquid phase change material in the spaces between the adjacent layers of the phase-stable material. The liquid phase change material is configured to become gaseous phase change material based on thermal energy absorbed by the liquid phase change material. The thermal absorber and isolator further includes at least one release configured to block passage of the liquid phase change material out of the spaces between the adjacent layers of the phase-stable material. The at least one release is also configured to allow passage of the gaseous phase change material out of the spaces between the adjacent layers of the phase-stable material.

In a third embodiment, a method includes operating a thermal absorber and isolator in a first configuration. The thermal absorber and isolator includes (i) multiple layers of phase-stable material where adjacent layers of the phase-stable material are separated by multiple spaces, (ii) liquid phase change material in the spaces between the adjacent layers of the phase-stable material, and (iii) at least one release blocking passage of the liquid phase change material out of the spaces between the adjacent layers of the phase-stable material. The method also includes, in the first configuration, absorbing thermal energy using the liquid phase change material to convert the liquid phase change material into gaseous phase change material. The method further includes opening the at least one release to allow passage of the gaseous phase change material out of the spaces between the adjacent layers of the phase-stable material. In addition, the method includes operating the thermal absorber and isolator in a second configuration in which the layers of phase-stable material are separated by air gaps and function as a thermal isolator.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
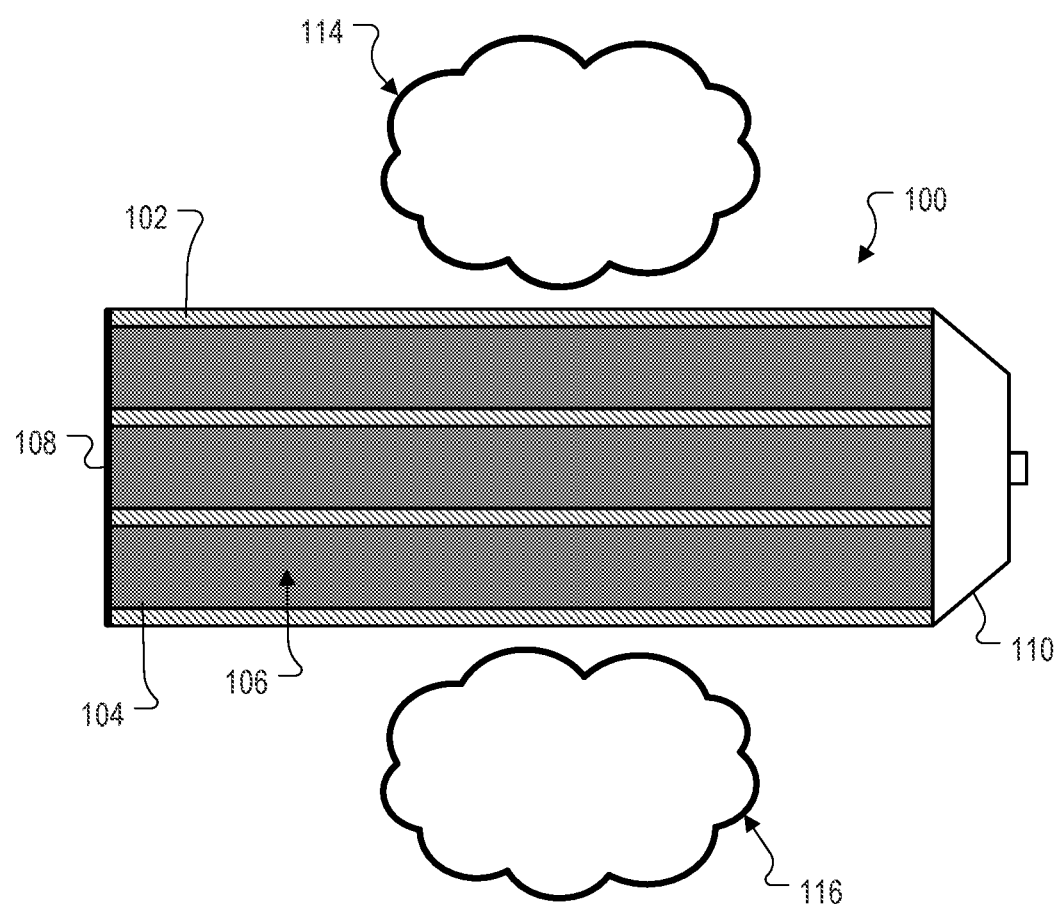
FIGS. 1 and 2 illustrate a first example multi-function thermal absorber and isolator using liquid-to-gas phase change material according to this disclosure.

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, during high-speed flight, heat is created by friction of the surrounding air against an outer skin of a flight vehicle. The heat produced by this process can travel through the airframe of the flight vehicle and into the internal components of the flight vehicle. This can interfere with the proper operation of or damage the flight vehicle's internal components.

Some previous approaches have used an insulator (such as an air gap or a solid insulator) to reduce heat transfer between the outer skin and the internal components of a flight vehicle. Unfortunately, while an air gap typically reduces conduction of heat, the air gap typically allows convection and radiation of heat. Also, while a solid insulator typically reduces convection and radiation of heat, the solid insulator typically allows conduction of heat at faster rates compared to air. Other previous approaches have used pressure vessels that allow material to reach critical temperatures and pressures and become insulative. While effective, flight vehicles are highly size- and weight-constrained in many cases, which means that a flight vehicle typically has a limited amount of space and can carry a limited amount of weight. The use of a pressure vessel can increase the size and weight of a thermal management system and an overall system. In addition, in some previous approaches, solid heat sinks can be used to remove heat from within the interior of a flight vehicle. However, the use of solid heat sinks again increases the size and weight of a thermal management system and an overall system. Because of these or other issues, there may not be adequate space in a package for an insulating or thermal management system that provides adequate thermal isolation and satisfies size and weight limits.

This disclosure provides multi-function thermal absorbers and isolators using liquid-to-gas phase change material. As described in more detail below, each of the multi-function thermal absorbers and isolators includes a structure having multiple layers of phase-stable material with low-emissivity surfaces. Prior to use, the structure initially has at least one liquid phase change material contained between the layers of phase-stable material, and one or more valves or other release mechanisms can be used to retain the liquid phase change material within the structure. Once a larger system is placed into operation, heat is absorbed by the structure, causing the liquid phase change material to vaporize or otherwise create gaseous phase change material. The one or more valves or other release mechanisms allow the gas to vent or otherwise exit the structure (and possibly to exit a flight vehicle or other larger system itself), leaving air in the structure between the layers of phase-stable material.

As a result, each multi-function thermal absorber and isolator initially functions as a thermal absorber. In this configuration, the structure acts as a thermal absorber since heat is removed by the structure via the vaporization of the liquid phase change material and the removal of the gaseous phase change material. This can help to significantly reduce heat transfer into one or more protected electronics or other protected components. Once the liquid phase change material is substantially or completely vaporized and released from the structure, the structure functions as a thermal isolator. In that configuration, the structure acts as a thermal isolator since the layers of phase-stable material have low-emissivity surfaces and are separated by air gaps, thereby reducing heat transfer between the layers of phase-stable material. Again, this can help to significantly reduce heat transfer into one or more protected electronics or other protected components.

The multi-function thermal absorbers and isolators described below can be used in any number of ways. For example, in some embodiments, at least one multi-function thermal absorber and isolator can be positioned between an airframe and one or more internal components of a flight vehicle. In other embodiments, at least one multi-function thermal absorber and isolator can be positioned at least partially around or in proximity to one or more protected components internally within a flight vehicle or other structure. In still other embodiments, at least one multi-function thermal absorber and isolator can be integrated into one or more protected components within a flight vehicle or other structure. Of course, the thermal absorbers and isolators can be used in any other suitable manner.

In this way, each multi-function thermal absorber and isolator helps to impede heat transfer into one or more protected components, which can improve the insulation of the one or more protected components. Also, each multi-function thermal absorber and isolator can operate at low pressures of its liquid phase change material, which can help to reduce or eliminate the need for bulky pressure vessels or other larger structures. Further, once substantially all liquid phase change material has been vaporized or otherwise removed from a multi-function thermal absorber and isolator, the structure can effectively operate as an insulator formed by layers of low-emissivity material separated by air gaps. Since the structure initially fills the air gaps with liquid phase change material to impede heat transfer, the overall thickness requirement for the structure can be lower compared to conventional insulative structures. In addition, these approaches enable a thermal absorber and insulator to be packaged where previously only a thermal insulator would fit. Additional features and benefits of the multi-function thermal absorbers and isolators are provided below.

Figure 2:
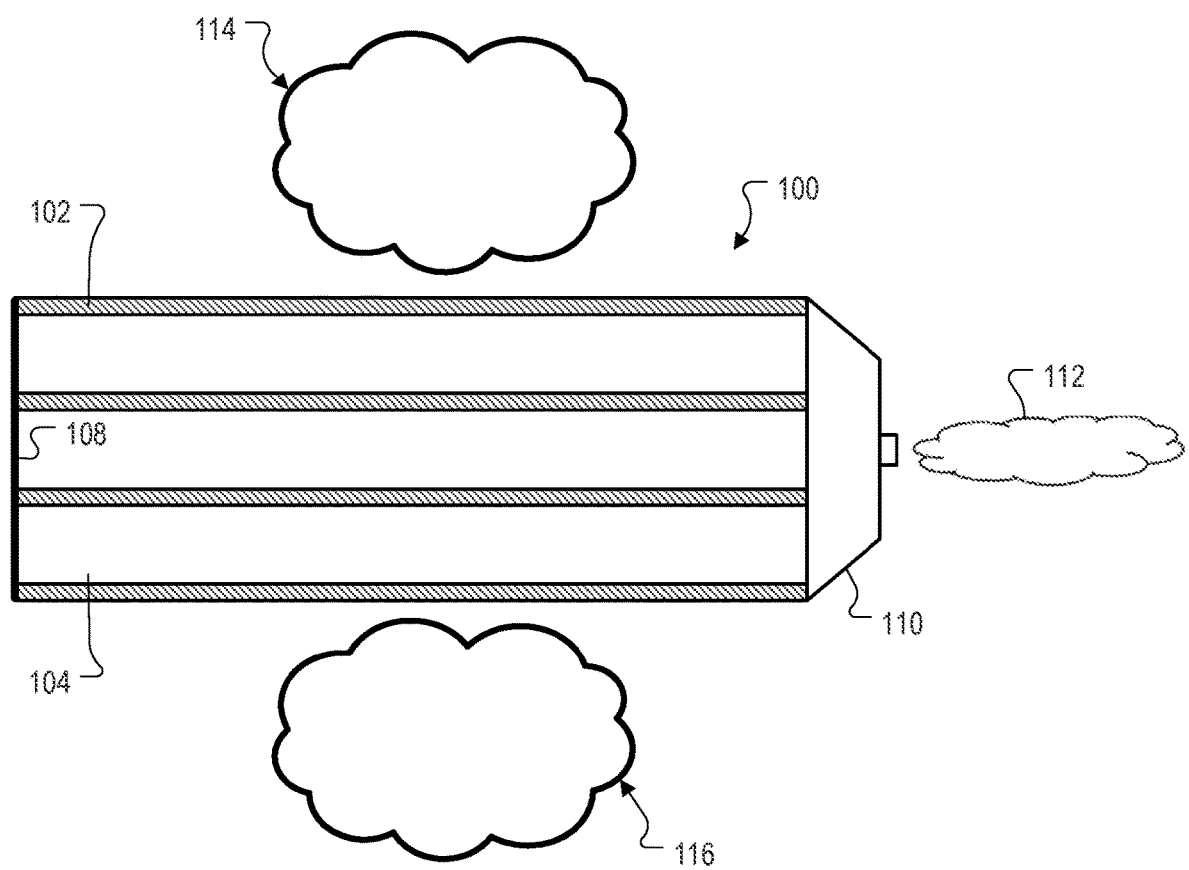

FIGS. 1 and 2 illustrate a first example multi-function thermal absorber and isolator 100 using liquid-to-gas phase change material according to this disclosure. As shown in FIG. 1, the thermal absorber and isolator 100 includes multiple layers 102 of phase-stable material that are separated from one another by spaces 104. In FIG. 1, a liquid phase change material 106 has been inserted into the spaces 104 between the phase-stable layers 102. The liquid phase change material 106 can occupy most or all of the available spaces 104 between the phase-stable layers 102.

The phase-stable layers 102 generally represent layers of material that do not change phase, at least within the expected operating temperature range of the thermal absorber and isolator 100. Each of the phase-stable layers 102 can be formed from any suitable material, and the phase-stable layers 102 may be rigid or flexible. For example, each of the phase-stable layers 102 may be formed as a rigid or malleable layer using one or more metals, such as aluminum. As another example, each of the phase-stable layers 102 may be formed as a flexible layer using one or more polymers, such as biaxially-oriented polyethylene terephthalate (MYLAR) or poly (4,4'-oxydiphenylene-pyromellitimide) (KAPTON). As yet another example, each of the phase-stable layers 102 may be formed using a composite material. In general, each of the phase-stable layers 102 can be formed from any suitable structurally-sound material. Each of the phase-stable layers 102 can also be formed in any suitable manner, such as by stacking the phase-stable layers 102. In addition, each of the phase-stable layers 102 can have any suitable size, shape, and dimensions. For instance, each of the phase-stable layers 102 may represent a thin sheet or other thin layer of material. Note that while four phase-stable layers 102 are shown in FIG. 1, the multi-function thermal absorber and isolator 100 can include any suitable number of phase-stable layers 102. In particular embodiments, the thermal absorber and isolator 100 includes at least three phase-stable layers 102.

Each of the spaces 104 generally represents a volume that can receive and hold the liquid phase change material 106. Each of the spaces 104 can be formed in any suitable manner, such as by stacking the phase-stable layers 102 and leaving gaps between the phase-stable layers 102. Each of the spaces 104 can also have any suitable size, shape, and dimensions. Note that while three spaces 104 are shown in FIG. 1, the multi-function thermal absorber and isolator 100 can include any suitable number of spaces 104. In particular embodiments, the thermal absorber and isolator 100 includes at least two spaces 104.

Each of the phase-stable layers 102 can have two major surfaces on opposite sides of the phase-stable layer 102. In FIG. 1, the major surfaces represent the top and bottom surfaces of the phase-stable layers 102. At least the major surfaces of adjacent phase-stable layers 102 that face each other (and possibly all major surfaces of all phase-stable layers 102 or all surfaces of all phase-stable layers 102) represent low-emissivity surfaces. This means that these surfaces of the phase-stable layers 102 are not very effective at emitting energy as thermal radiation. Because of this, thermal energy (heat) cannot be effectively transferred between adjacent phase-stable layers 102 through the thermal absorber and isolator 100 via radiation.

The liquid phase change material 106 generally represents material that changes phase as thermal energy is absorbed by the thermal absorber and isolator 100. In particular, the liquid phase change material 106 vaporizes or otherwise becomes gaseous when absorbing the thermal energy. The liquid phase change material 106 represents any suitable liquid material that is used to absorb thermal energy and vaporize or otherwise become gaseous in response to the thermal energy. Example types of liquid phase change material 106 can include methanol or ammonia. In some embodiments, the liquid phase change material 106 represents a liquid that has a low pressure after vaporization.

One or more seals 108 can be used to block escape of the liquid phase change material 106 from the spaces 104 between the phase-stable layers 102. In this example, one seal 108 is shown on the left side of the thermal absorber and isolator 100. However, one or more seals 108 may substantially surround the thermal absorber and isolator 100 or otherwise be used to block escape of the liquid phase change material 106 (except as described below). Each seal 108 can be formed from any suitable material and in any suitable manner. Also, each seal 108 can have any suitable size, shape, and dimensions. Depending on the implementation, each seal 108 can be rigid or flexible.

A release 110 is used in the thermal absorber and isolator 100 to selectively block or allow passage of phase change material out of the structure. In FIG. 1, the release 110 is in a closed state that retains the liquid phase change material 106 in the spaces 104 between the phase-stable layers 102. In FIG. 2, the release 110 is in an opened state that allows vaporized or other gaseous phase change material 112 to be released from the spaces 104 between the phase-stable layers 102. Although not shown here, a conduit or other passage may be used to transport the gaseous phase change material 112 away from the thermal absorber and isolator 100, such as to the exterior of a flight vehicle. The release 110 includes any suitable structure configured to retain a liquid phase change material and release gaseous phase change material. For instance, the release 110 may represent a pressure relief valve, a controllable valve, or a burst disc or other structure that cracks or otherwise fractures. In some embodiments, the release 110 may represent a reusable part, meaning the release 110 can be opened and reset (closed) as needed. In other embodiments, the release 110 may represent an expendable part, meaning the release 110 needs to be replaced once opened. Of course, if the thermal absorber and isolator 100 is used in a one-time-use system like a missile, there may be no need or ability to replace the release 110 after use.

As noted above, the multi-function thermal absorber and isolator 100 can be used in any number of ways. In general, the thermal absorber and isolator 100 can be positioned (thermally or physically) between a hotter environment 114 and a cooler protected environment 116. The hotter environment 114 generally includes any suitable environment in which thermal energy is generated or received, where that thermal energy can then be transferred towards the protected environment 116. The protected environment 116 generally includes any suitable environment in which one or more components are insulated from thermal energy by the thermal absorber and isolator 100. In some embodiments, the thermal absorber and isolator 100 can be placed between an airframe of a flight vehicle (the hotter environment 114) and internal components of the flight vehicle (the protected environment 116). In particular embodiments, the thermal absorber and isolator 100 can be placed in the space where standard insulation would typically be located between the airframe and the internal components of the flight vehicle. In other embodiments, the thermal absorber and isolator 100 can be placed at least partially around or in proximity to one or more protected components internally within a flight vehicle or other structure to thermally insulate those components (the protected environment 116) from other interior spaces or components of the flight vehicle (the hotter environment 114). In some instances, the thermal absorber and isolator 100 can be placed on one or more exterior surfaces of a protected component. Of course, the thermal absorber and isolator 100 can be used in any other suitable manner.

Prior to deployment of a flight vehicle or other larger system that includes the thermal absorber and isolator 100, the liquid phase change material 106 can fill all or substantially all of the spaces 104 between the phase-stable layers 102, and the release 110 can be closed or otherwise configured to keep the liquid phase change material 106 within the spaces 104. This configuration of the thermal absorber and isolator 100 is shown in FIG. 1. In this configuration, the thermal absorber and isolator 100 is configured to operate as a thermal absorber. Thus, initially after deployment of the flight vehicle or other larger system, thermal energy can pass through the phase-stable layers 102 into the liquid phase change material 106, which absorbs the thermal energy and changes phase. The presence of the phase change material (in liquid and/or gaseous form) between the phase-stable layers 102 helps to provide for conduction of the thermal energy between the different phase-stable layers 102 and into the various spaces 104 of the structure. As use of the thermal absorber and isolator 100 continues, all or substantially all of the liquid phase change material 106 can enter the gaseous state, allowing the thermal absorber and isolator 100 to absorb a maximum or near-maximum amount of thermal energy. It should be noted that while the structure is acting as a thermal absorber here, the thermal absorber and isolator 100 is providing thermal insulation for the protected environment 116.

At some point, the release 110 opens, fractures, or otherwise allows the gaseous phase change material 112 to escape from the spaces 104 between the phase-stable layers 102, and air can substantially or completely fill the spaces 104. This configuration of the thermal absorber and isolator 100 is shown in FIG. 2. In this configuration, the thermal absorber and isolator 100 is configured to operate as a thermal isolator. Thus, if additional thermal energy is received by the structure, the phase-stable layers 102 can resist the transfer of the thermal energy through the thermal absorber and isolator 100. This is because the phase-stable layers 102 are now separated by air gaps and because at least the major surfaces of the phase-stable layers 102 have low emissivity. Once again, the thermal absorber and isolator 100 is providing thermal insulation for the protected environment 116.

In this way, the multi-function thermal absorber and isolator 100 provides for thermal mitigation or thermal management in a small form factor by utilizing a strategic combination of materials that first act as a thermal absorber and later act as a thermal insulator. This enables the use of the thermal absorber and isolator 100 in a number of applications, including applications that are highly size- and weight-constrained. Moreover, in some embodiments, the thermal absorber and isolator 100 lacks any structural matrix positioned between adjacent phase-stable layers 102, which would otherwise provide a pathway for thermal energy to pass through the structure from the hotter environment 114 towards the protected environment 116.

Note that while the phase-stable layers 102 are shown here as having the same size and shape and the spaces 104 are shown here as having the same size and shape, this need not be the case. For example, phase-stable layers 102 and/or spaces 104 closer to the hotter environment 114 may be larger or smaller than other phase-stable layers 102 and/or spaces 104.

Also note that while the same liquid phase change material 106 has been described as being used in all of the spaces 104, it is possible to use different liquid phase change materials 106 in the same spaces 104 or in different spaces 104. For instance, different liquid phase change materials 106 having different vaporization temperatures may be used in different spaces 104. This may allow, for example, liquid phase change materials 106 having lower vaporization temperatures to be used closer to the hotter environment 114 and liquid phase change materials 106 having higher vaporization temperatures to be used closer to the protected environment 116 (or vice versa). As a particular example, different liquid phase change materials 106 may be staged so that the liquid phase change materials 106 are arranged in a desired order within the thermal absorber and isolator 100 (such as in order of increasing or decreasing vaporization temperatures). Depending on the liquid phase change materials 106 used, at least some of the phase-stable layers 102 and/or spaces 104 can differ in sizes or shapes to accommodate the different vapor pressures of the liquid phase change materials 106.

Although FIGS. 1 and 2 illustrate one example of a multi-function thermal absorber and isolator 100 using liquid-to-gas phase change material, various changes may be made to FIGS. 1 and 2. For example, the relative sizes, shapes, and dimensions of the various components of the thermal absorber and isolator 100 can vary as needed or desired. Also, the number and arrangement of the phase-stable layers 102, spaces 104, seals 108, releases 110, and other components can vary as needed or desired.

Figure 3:
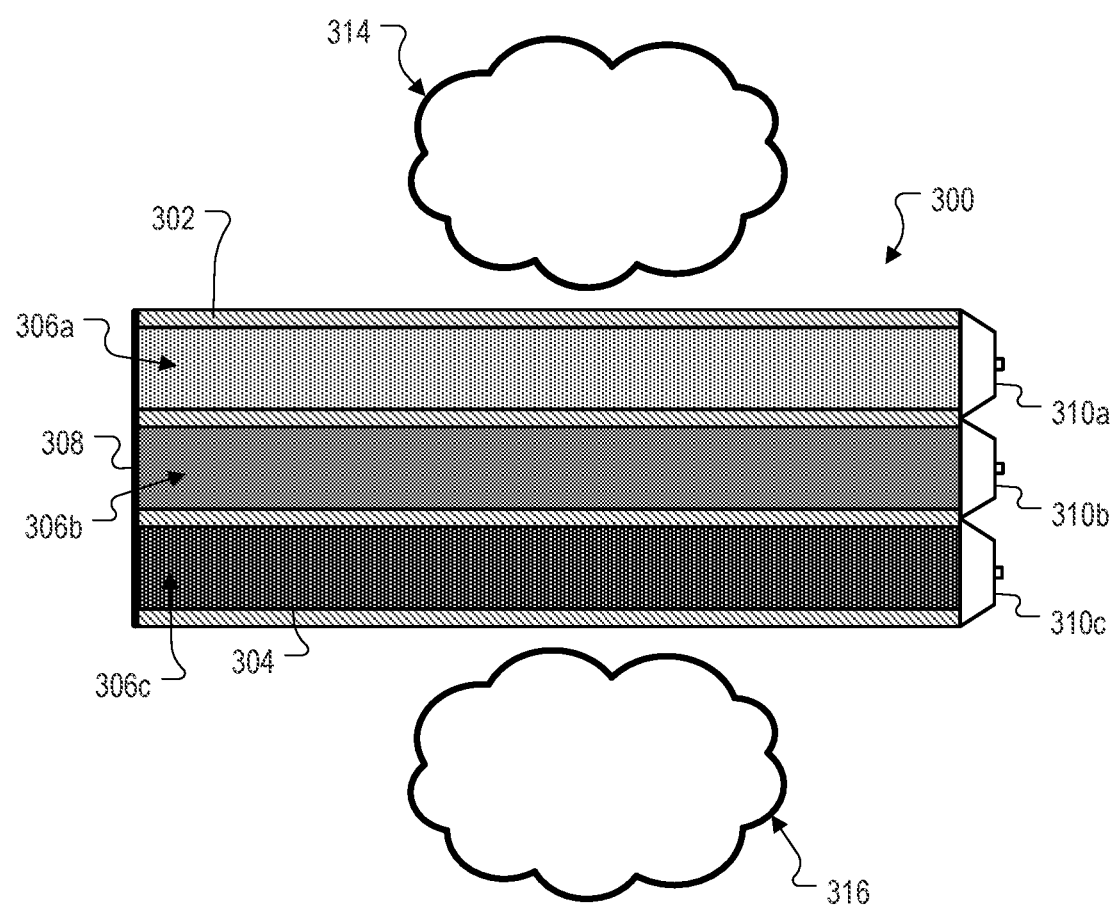
FIGS. 3 and 4 illustrate a second example multi-function thermal absorber and isolator using liquid-to-gas phase change material according to this disclosure.
Figure 4:
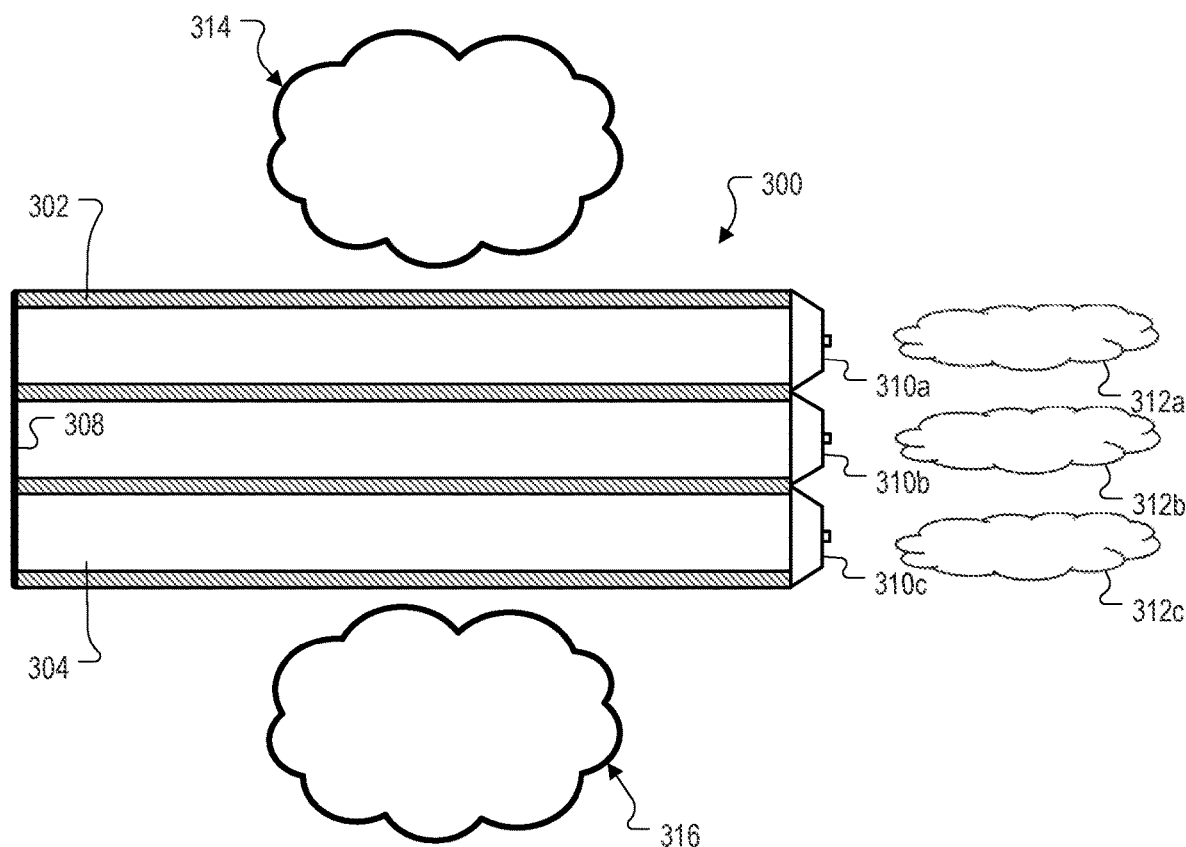

FIGS. 3 and 4 illustrate a second example multi-function thermal absorber and isolator 300 using liquid-to-gas phase change material according to this disclosure. The thermal absorber and isolator 300 as shown in FIGS. 3 and 4 includes many components in common with the thermal absorber and isolator 100 as shown in FIGS. 1 and 2. For example, the thermal absorber and isolator 300 includes multiple phase-stable layers 302, which may be the same as or similar to the phase-stable layers 102. The thermal absorber and isolator 300 also includes multiple spaces 304 between the phase-stable layers 302, which may be the same as or similar to the spaces 104. The thermal absorber and isolator 300 further includes one or more seals 308, which may be the same as or similar to the one or more seals 108. In addition, the thermal absorber and isolator 300 can be positioned (thermally or physically) between a hotter environment 314 and a protected environment 316, which may be the same as or similar to the hotter environment 114 and the protected environment 116.

In this example, different liquid phase change materials 306a-306c are used in different spaces 304 of the thermal absorber and isolator 300. In this particular example, three different liquid phase change materials 306a-306c are used in three different spaces 304 of the thermal absorber and isolator 300, although the thermal absorber and isolator 300 may use two or more than three liquid phase change materials in two or more than three spaces. The liquid phase change materials 306a-306c used here may have different vaporization temperatures, which causes the liquid phase change materials 306a-306c to vaporize or otherwise enter their gaseous states at different temperatures (and therefore potentially at different times).

Unlike the example embodiment shown in FIGS. 1 and 2 (where one or more liquid phase change materials 106 may be used with a single release 110), the thermal absorber and isolator 300 here includes multiple releases 310a-310c. This allows different releases 310a-310c to be used with different spaces 304 containing different liquid phase change materials 306a-306c. Thus, each release 310a-310c can open, fracture, or otherwise allow a gaseous phase change material 312a-312c to escape from the associated space 304 as shown in FIG. 4.

In some embodiments, the releases 310a-310c may be triggered in order (such as top-to-bottom or bottom-to-top) as the liquid phase change materials 306a-306c enter their gaseous states. As a particular example, the release 310a may be triggered prior to the releases 310b-310c, and the release 310b may be triggered prior to the release 310c. In other embodiments, the releases 310a-310c may be triggered at substantially the same time. In still other embodiments, each of the releases 310a-310c may be triggered whenever the pressure in the associated space 304 exceeds a threshold value, and the threshold value may or may not differ among the releases 310a-310c. Once again, depending on the liquid phase change materials 306a-306c used, at least some of the phase-stable layers 302 and/or spaces 304 can differ in sizes or shapes to accommodate the different vapor pressures of the liquid phase change materials 306a-306c.

Although FIGS. 3 and 4 illustrate another example of a multi-function thermal absorber and isolator 300 using liquid-to-gas phase change material, various changes may be made to FIGS. 3 and 4. For example, the relative sizes, shapes, and dimensions of the various components of the thermal absorber and isolator 300 can vary as needed or desired. Also, the number and arrangement of the phase-stable layers 302, spaces 304, seals 308, releases 310a-310c, and other components can vary as needed or desired.

Figure 5:
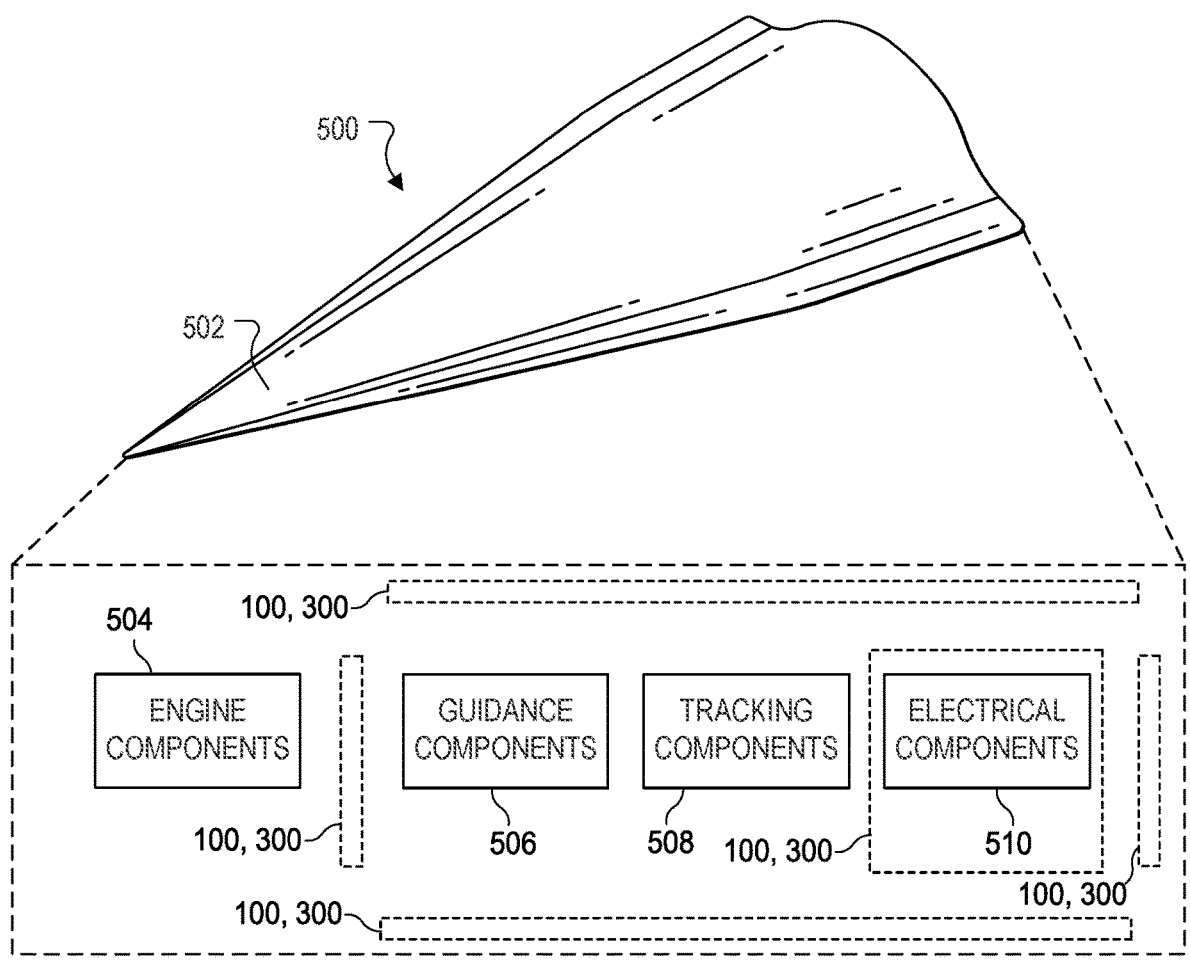
FIG. 5 illustrates an example flight vehicle having at least one multi-function thermal absorber and isolator according to this disclosure.

FIG. 5 illustrates an example flight vehicle 500 having at least one multi-function thermal absorber and isolator according to this disclosure. For ease of explanation, the flight vehicle 500 as shown in FIG. 5 is described as having at least one multi-function thermal absorber and isolator 100 or 300 as shown in FIGS. 1 through 4. However, the flight vehicle 500 may include any suitable multi-function thermal absorber and isolator designed in accordance with this disclosure. Also, the multi-function thermal absorbers and isolators 100, 300 as shown in FIGS. 1 through 4 may be used in any other suitable flight vehicle or any other suitable system.

As shown in FIG. 5, the flight vehicle 500 generally represents an object that flies through, is launched through or into, or otherwise travels through a given space. The flight vehicle 500 can represent a vehicle that travels through an atmosphere or in space. Example types of flight vehicles can include projectiles, rockets, missiles, drones, aircraft, satellites, and spacecraft. The flight vehicle 500 includes any suitable object configured to operate within a high-temperature environment.

In this particular example, the flight vehicle 500 represents a hypersonic vehicle, which typically refers to an object that can travel at a speed of at least Mach 5 (about 3,836 miles per hour or about 6,174 kilometers per hour). In such a hypersonic vehicle, friction caused by passage of the vehicle 500 through the atmosphere can generate large amounts of heat within the vehicle 500. Note that the form factor of the flight vehicle 500 shown in FIG. 5 is for illustration only. A number of hypersonic vehicle designs have been proposed, and this disclosure is not limited to any specific design for a hypersonic vehicle. Moreover, this disclosure is not limited to use with hypersonic vehicles. For example, any vehicle or other object in which heat can be generated through aerodynamic drag can be used here, or any object that otherwise generates adequate heat or is used in a high-temperature environment can be used here.

As shown in FIG. 5, the flight vehicle 500 includes a body 502, which generally surrounds other components of the flight vehicle 500. The body 502 can have any suitable size, shape, and dimensions. In a hypersonic flight vehicle, for example, the body 502 has a highly aerodynamic shape that enables the flight vehicle 500 to travel through the atmosphere at extremely high rates of speed. Of course, the design for the body 502 can vary widely based on the intended application. The body 502 can also be formed from any suitable material. Depending on the application and the environment in which the body 502 will be used, the body 502 can be formed from exotic materials that have extremely high temperature resistances. However, this is not required, and the body 502 can be formed from more conventional materials that can still withstand the expected temperatures for a given application. In addition, the body 502 can be formed in any suitable manner.

The flight vehicle 500 also includes various components, at least some of which can be partially or completely within the body 502 of the flight vehicle 500. For example, the flight vehicle 500 may include one or more engine components 504, which generally represent components used to generate thrust that propels the flight vehicle 500. The engine components 504 can include any suitable type of engine, such as a ramjet or scramjet. The flight vehicle 500 may also include one or more guidance components 506, which may be used to help guide the flight vehicle 500 during flight. The guidance components 506 can include any suitable type of location detection or guidance systems, such as Global Positioning System (GPS) receivers or other satellite-based or other location detection systems. The flight vehicle 500 may further include one or more tracking components 508, which may be used to track one or more objects or areas to be struck by the flight vehicle 500. The tracking components 508 can include any suitable type of object or other tracking systems, such as electro-optical (EO) tracking systems. In addition, the flight vehicle 500 may include one or more electrical components 510, which may be used to process data, control other components of the flight vehicle 500, or perform other functions in the flight vehicle 500. The electrical components 510 can include any suitable type of processing, control, or other electrical or electronic devices, such as microprocessors, microcontrollers, digital signal processors (DSPs), field programmable gate arrays (FPGAs), application-specific integrated circuits (ASICs), or discrete circuitry.

One or more instances of the multi-function thermal absorber and isolator 100, 300 may be used in the flight vehicle 500. For example, one or more instances of the multi-function thermal absorber and isolator 100, 300 may be positioned between the body 502 and various ones of the components 506, 508, 510. As another example, one or more instances of the multi-function thermal absorber and isolator 100, 300 may be positioned between the engine components 504 and various ones of the components 506, 508, 510. As still another example, one or more instances of the multi-function thermal absorber and isolator 100, 300 may at least partially surround or be placed on one or more exterior surfaces of one or more of the components 506, 508, 510. Note that the multi-function thermal absorbers and isolators 100, 300 shown in FIG. 5 are for illustration only and that one or more thermal absorbers and isolators 100, 300 can be used in the flight vehicle 500 in any suitable manner.

Although FIG. 5 illustrates one example of a flight vehicle 500 having at least one multi-function thermal absorber and isolator, various changes may be made to FIG. 5. For example, any other suitable systems can include one or more multi-function thermal absorbers and isolators 100, 300. Other example applications in which one or more the multi-function thermal absorbers and isolators 100, 300 can be used include missiles, commercial or military rockets, or other commercial or military flight vehicles. Moreover, the multi-function thermal absorbers and isolators 100, 300 may be used in other environments and are not limited to use with flight vehicles.

Figure 6:
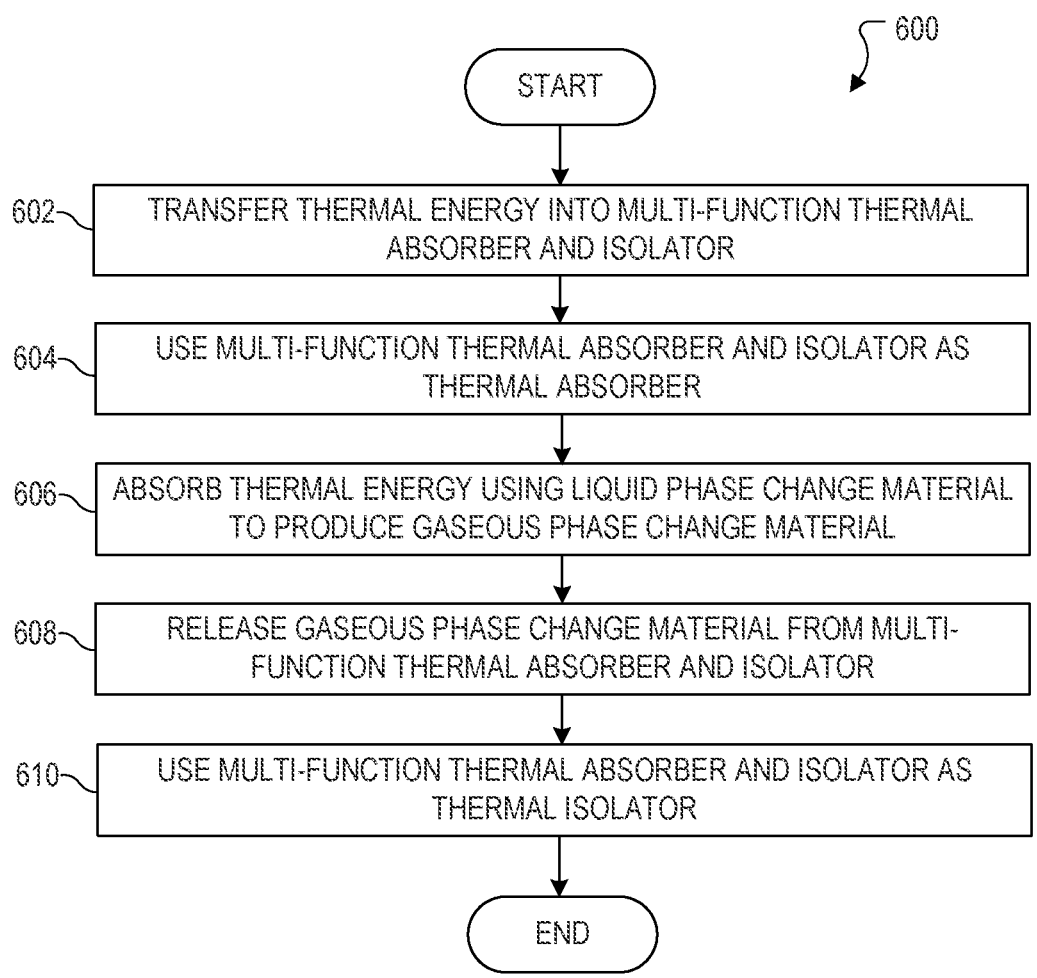
FIG. 6 illustrates an example method for using a multi-function thermal absorber and isolator according to this disclosure.

FIG. 6 illustrates an example method 600 for using a multi-function thermal absorber and isolator according to this disclosure. For ease of explanation, the method 600 as shown in FIG. 6 is described as involving the use of at least one multi-function thermal absorber and isolator 100 or 300 as shown in FIGS. 1 through 4 in the flight vehicle 500 as shown in FIG. 5. However, the method 600 may involve the use of any suitable multi-function thermal absorber and isolator designed in accordance with this disclosure in any suitable device or system.

As shown in FIG. 6, thermal energy is transferred into a multi-function thermal absorber and isolator at step 602. This may include, for example, thermal energy from the hotter environment 114, 314 being generated and transferred into one or more instances of the multi-function thermal absorber and isolator 100, 300. As a particular example, this may include thermal energy generated by friction of air against the body 502 of the flight vehicle 500 being generated and provided to one or more instances of the multi-function thermal absorber and isolator 100, 300.

The multi-function thermal absorber and isolator initially functions as a thermal absorber at step 604, and the thermal energy is absorbed using a liquid phase change material to produce gaseous phase change material at step 606. This may include, for example, passing the thermal energy through the phase-stable layers 102, 302 and into the liquid phase change material 106, 306a-306c in the spaces 104, 304 between the phase-stable layers 102, 302 of each thermal absorber and isolator 100, 300. This may also include vaporizing or otherwise converting the liquid phase change material 106, 306a-306c into the gaseous phase change material 112, 312a-312c. As noted above, in some embodiments, different liquid phase change materials 106, 306a-306c can be used in different spaces 104, 304 of at least one thermal absorber and isolator 100, 300. The different liquid phase change materials 106, 306a-306c may optionally be staged so that the liquid phase change materials 106, 306a-306c are arranged in a desired order within the at least one thermal absorber and isolator 100, 300 (such as in order of increasing or decreasing vaporization temperatures). Depending on the design of each thermal absorber and isolator 100, 300 and the liquid phase change material 106, 306a-306c used, the vaporized phase change material can have relatively low pressures within the associated spaces 104, 304. During this time, the at least one thermal absorber and isolator 100, 300 is functioning as a thermal absorber since thermal energy is being absorbed by the liquid phase change material 106, 306a-306c. This helps to reduce or prevent thermal energy transfer from the hotter environment 114, 314 to at least one protected environment 116, 316.

The multi-function thermal absorber and isolator releases its gaseous phase change material at step 608. This may include, for example, the release 110, 310a-310c of each multi-function thermal absorber and isolator 100, 300 opening, fracturing, or otherwise allowing passage of the gaseous phase change material 112, 312a-312c out of the spaces 104, 304 of the thermal absorber and isolator 100, 300. This may also include air filling the spaces 104, 304 of each thermal absorber and isolator 100, 300, creating air gaps between the phase-stable layers 102, 302 of the thermal absorber and isolator 100, 300. As noted above, in some embodiments, at least one instance of the thermal absorber and isolator 100, 300 may include multiple releases 310a-310c. In those embodiments, the releases 310a-310c may be opened at the same time or at different times. At this point, the multi-function thermal absorber and isolator functions as a thermal isolator at step 610. This may include, for example, the phase-stable layers 102, 302 of each instance of the thermal absorber and isolator 100, 300 (with their low-emissivity surfaces and associated air gaps) impeding the transfer of thermal energy through the thermal absorber and isolator 100, 300 to the at least one protected environment 116, 316.

Although FIG. 6 illustrates one example of a method 600 for using a multi-function thermal absorber and isolator, various changes may be made to FIG. 6. For example, while shown as a series of steps, various steps in FIG. 6 may overlap, occur in parallel, or occur in a different order.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "device," "component," "element," "apparatus," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   at least three layers of phase-stable material arranged in a stack, wherein adjacent layers of the phase-stable material are separated by multiple spaces that contain no solid material;
   liquid phase change material in the spaces between the adjacent layers of the phase-stable material, the liquid phase change material configured to become gaseous phase change material based on thermal energy absorbed by the liquid phase change material, wherein the spaces are physically separated from each other by the layers of the phase-stable material, and wherein the layers of the phase-stable material are non-porous so as to prevent movement of the liquid phase change material through the layers of the phase-stable material; and
   at least one release configured to block passage of the liquid phase change material out of the spaces between the adjacent layers of the phase-stable material, the at least one release also configured to allow passage of the gaseous phase change material out of the spaces between the adjacent layers of the phase-stable material;
   wherein the at least one release comprises at least one controllable valve configured to be selectively closed and opened to control a configuration of the apparatus.

2. The apparatus of claim 1, wherein the apparatus is configured to operate in multiple configurations, the configurations comprising:
   a first configuration in which (i) the at least one release blocks the passage of the liquid phase change material out of the spaces between the adjacent layers of the phase-stable material and (ii) the liquid phase change material absorbs the thermal energy; and
   a second configuration in which (i) the at least one release allows the passage of the gaseous phase change material out of the spaces between the adjacent layers of the phase-stable material and (ii) the layers of the phase-stable material function as a thermal isolator.

3. The apparatus of claim 2, wherein, in the second configuration, the layers of the phase-stable material are separated by air gaps.

4. The apparatus of claim 1, wherein:
   the at least one release comprises multiple releases; and
   each release is associated with at least one different space between the adjacent layers of the phase-stable material.

5. The apparatus of claim 4, wherein the liquid phase change material comprises multiple liquid phase change materials, different ones of the liquid phase change materials located in different ones of the spaces between the adjacent layers of the phase-stable material.

6. The apparatus of claim 1, further comprising:
at least one seal configured to block escape of the liquid phase change material from the spaces between the adjacent layers of the phase-stable material.

7. The apparatus of claim 1, wherein the liquid phase change material comprises methanol.

8. The apparatus of claim 1, wherein at least one of the layers of the phase-stable material is formed of a metal.

9. A system comprising:
one or more protected components; and
a thermal absorber and isolator configured to thermally insulate the one or more protected components, wherein the thermal absorber and isolator comprises:
at least three layers of phase-stable material arranged in a stack, wherein adjacent layers of the phase-stable material are separated by multiple spaces that contain no solid material;
liquid phase change material in the spaces between the adjacent layers of the phase-stable material, the liquid phase change material configured to become gaseous phase change material based on thermal energy absorbed by the liquid phase change material, wherein the spaces are physically separated from each other by the layers of the phase-stable material, and wherein the layers of the phase-stable material are non-porous so as to prevent movement of the liquid phase change material through the layers of the phase-stable material; and
at least one release configured to block passage of the liquid phase change material out of the spaces between the adjacent layers of the phase-stable material, the at least one release also configured to allow passage of the gaseous phase change material out of the spaces between the adjacent layers of the phase-stable material;
wherein the at least one release comprises at least one controllable valve configured to be selectively closed and opened to control a configuration of the thermal absorber and isolator.

10. The system of claim 9, wherein the thermal absorber and isolator is configured to operate in multiple configurations, the configurations comprising:
a first configuration in which (i) the at least one release blocks the passage of the liquid phase change material out of the spaces between the adjacent layers of the phase-stable material and (ii) the liquid phase change material absorbs the thermal energy; and
a second configuration in which (i) the at least one release allows the passage of the gaseous phase change material out of the spaces between the adjacent layers of the phase-stable material and (ii) the layers of the phase-stable material function as a thermal isolator.

11. The system of claim 10, wherein, in the second configuration, the layers of the phase-stable material are separated by air gaps.

12. The system of claim 9, wherein:
the at least one release comprises multiple releases; and
each release is associated with at least one different space between the adjacent layers of the phase-stable material.

13. The system of claim 12, wherein the liquid phase change material comprises multiple liquid phase change materials, different ones of the liquid phase change materials located in different ones of the spaces between the adjacent layers of the phase-stable material.

14. The system of claim 9, further comprising:
at least one seal configured to block escape of the liquid phase change material from the spaces between the adjacent layers of the phase-stable material.

15. The system of claim 9, wherein the one or more protected components comprise one or more internal components of a flight vehicle.

16. The system of claim 9, wherein the system comprises multiple thermal absorbers and isolators.

17. The system of claim 9, wherein the liquid phase change material comprises methanol.

18. A method comprising:
operating a thermal absorber and isolator in a first configuration, the thermal absorber and isolator comprising (i) at least three layers of phase-stable material arranged in a stack where adjacent layers of the phase-stable material are separated by multiple spaces that contain no solid material, (ii) liquid phase change material in the spaces between the adjacent layers of the phase-stable material, wherein the spaces are physically separated from each other by the layers of the phase-stable material, and wherein the layers of the phase-stable material are non-porous so as to prevent movement of the liquid phase change material through the layers of the phase-stable material, and (iii) at least one release blocking passage of the liquid phase change material out of the spaces between the adjacent layers of the phase-stable material, the at least one release comprising at least one controllable valve configured to be selectively closed and opened;
in the first configuration, absorbing thermal energy using the liquid phase change material to convert the liquid phase change material into gaseous phase change material;
controlling the at least one valve to open the at least one release and allow passage of the gaseous phase change material out of the spaces between the adjacent layers of the phase-stable material; and
operating the thermal absorber and isolator in a second configuration in which the layers of the phase-stable material are separated by air gaps and function as a thermal isolator.

19. The method of claim 18, wherein:
the at least one release comprises multiple releases; and
each release is associated with at least one different space between the adjacent layers of the phase-stable material.

20. The method of claim 19, wherein the liquid phase change material comprises multiple liquid phase change materials, different ones of the liquid phase change materials located in different ones of the spaces between the adjacent layers of the phase-stable material.

* * * * *